United States Patent
Shiraishi

(10) Patent No.: US 8,050,524 B2
(45) Date of Patent: Nov. 1, 2011

(54) OPTICAL DEVICE AND METHOD RELATED THERETO

(75) Inventor: Takashi Shiraishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 258 days.

(21) Appl. No.: 12/567,177

(22) Filed: Sep. 25, 2009

(65) Prior Publication Data

US 2010/0080507 A1    Apr. 1, 2010

(30) Foreign Application Priority Data

Sep. 26, 2008  (JP) .................................. 2008-247207

(51) Int. Cl.
- *G02B 6/12* (2006.01)
- *B29D 11/00* (2006.01)
- *H01L 21/00* (2006.01)

(52) U.S. Cl. ............... 385/14; 385/1; 385/11; 385/123; 385/130; 385/131; 385/40; 264/1.24; 438/31

(58) Field of Classification Search .................. 385/1, 2, 385/3, 11, 40, 41, 42, 129, 130, 131, 132, 385/14; 438/31, 33; 264/1.24
See application file for complete search history.

(56) References Cited

U.S. PATENT DOCUMENTS

| | | | |
|---|---|---|---|
| 5,652,674 A * | 7/1997 | Mizuuchi et al. | 359/326 |
| 5,790,719 A | 8/1998 | Mitomi et al. | 385/2 |
| 6,631,231 B2 * | 10/2003 | Mizuuchi et al. | 385/122 |
| 2006/0029319 A1 * | 2/2006 | Sugiyama | 385/1 |
| 2006/0079006 A1 | 4/2006 | Yamamoto et al. | 438/3 |
| 2010/0027935 A1 * | 2/2010 | Shiraishi | 385/2 |
| 2010/0080507 A1 * | 4/2010 | Shiraishi | 385/14 |

FOREIGN PATENT DOCUMENTS

| | | |
|---|---|---|
| JP | 05-210132 | 8/1993 |
| JP | 08-166566 | 6/1996 |
| JP | 10-039266 | 2/1998 |
| JP | 2005-274793 | 10/2005 |
| JP | 2005-275121 | 10/2005 |
| JP | 2005-284129 | 10/2005 |

OTHER PUBLICATIONS

Takashi Shiraishi, et al., "Suppression of thermal drift in an ultra-high-speed LiNbO3 optical modulator" 2007, pp. 169-170.

* cited by examiner

*Primary Examiner* — Brian Healy
(74) *Attorney, Agent, or Firm* — Staas & Halsey LLP

(57) ABSTRACT

An optical device includes an electrooptic crystal substrate, a polarization-inverted region formed in a part of the electrooptic crystal substrate, an optical waveguide formed in the electrooptic crystal substrate, and a groove for relaxing stress disposed between a domain wall of the polarization-inverted region and the optical waveguide.

13 Claims, 11 Drawing Sheets

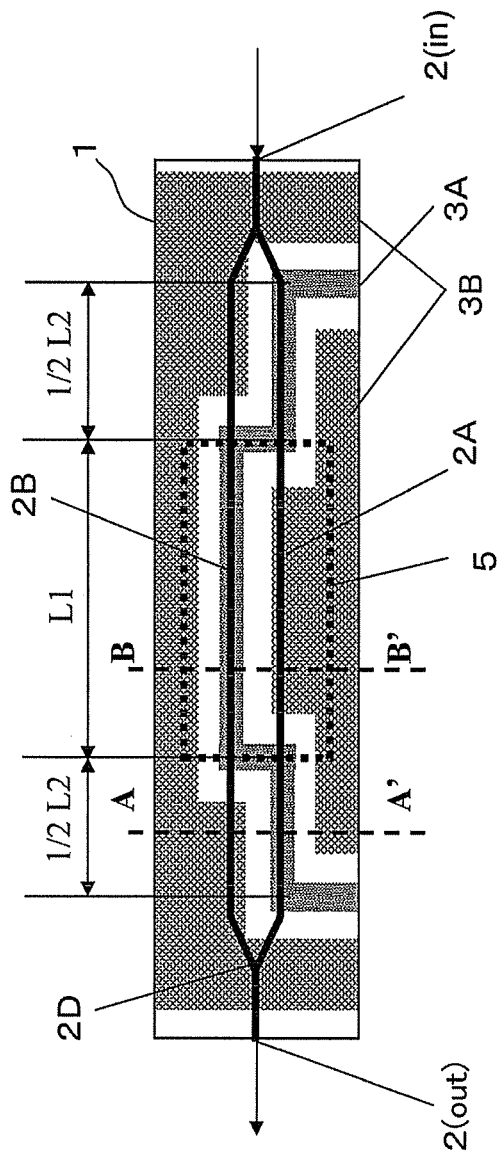
FIG. 1A
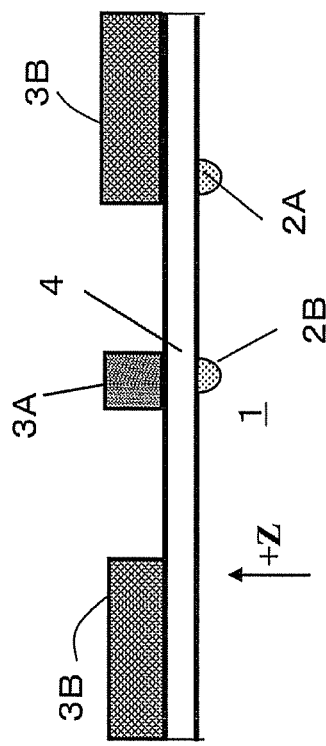
FIG. 1B  A-A'  RELATED ART
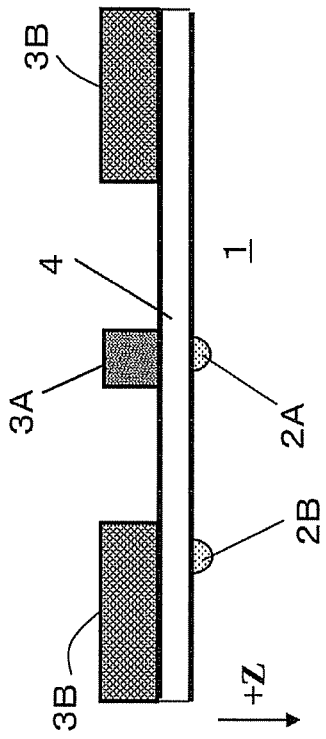
FIG. 1C  B-B'  RELATED ART

A-A' CROSS SECTION
RELATED ART

B-B' CROSS SECTION
RELATED ART

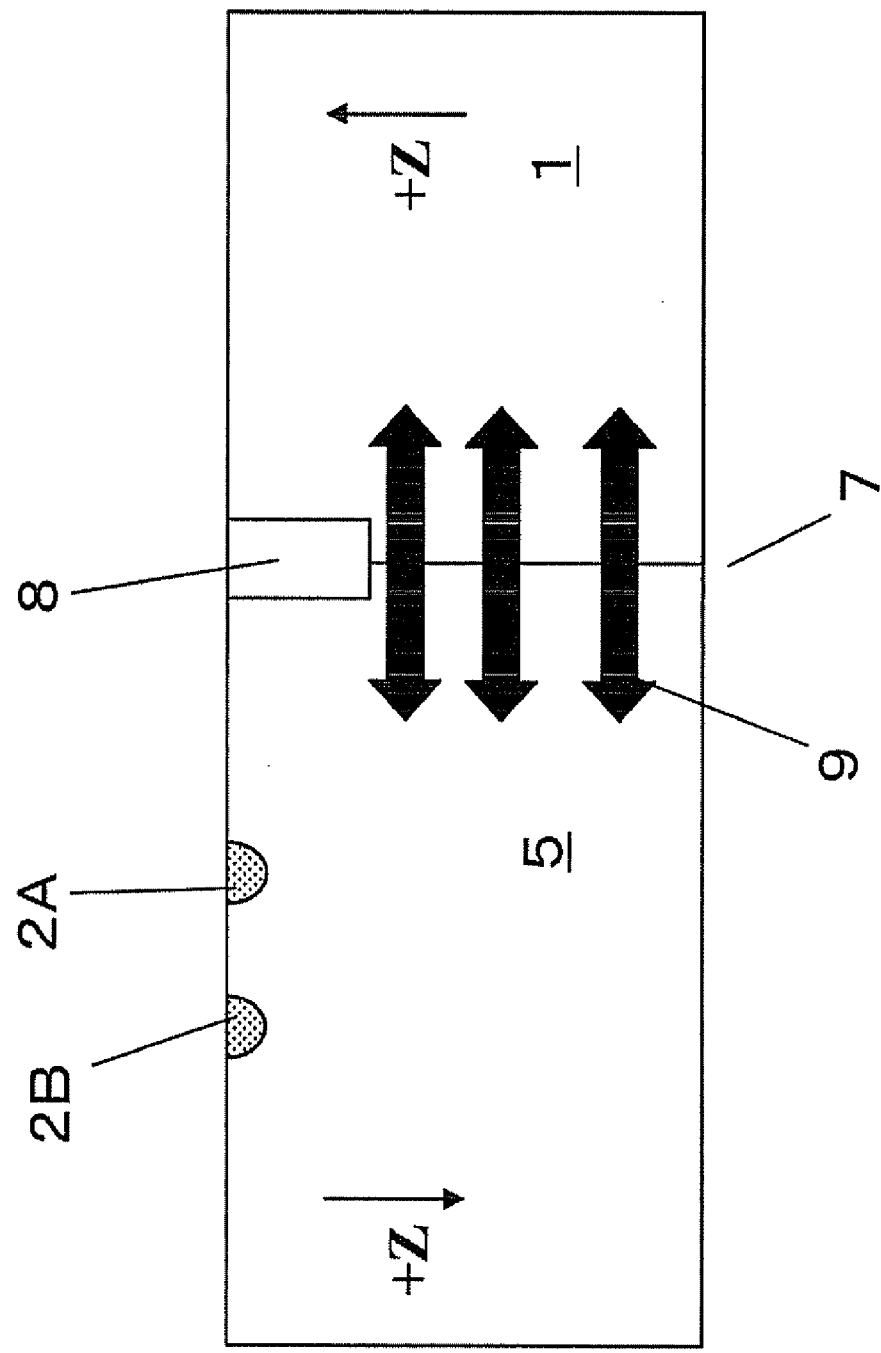

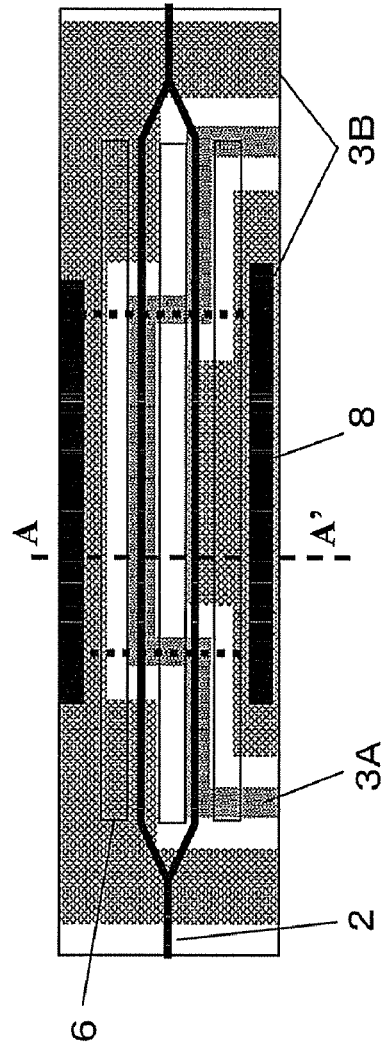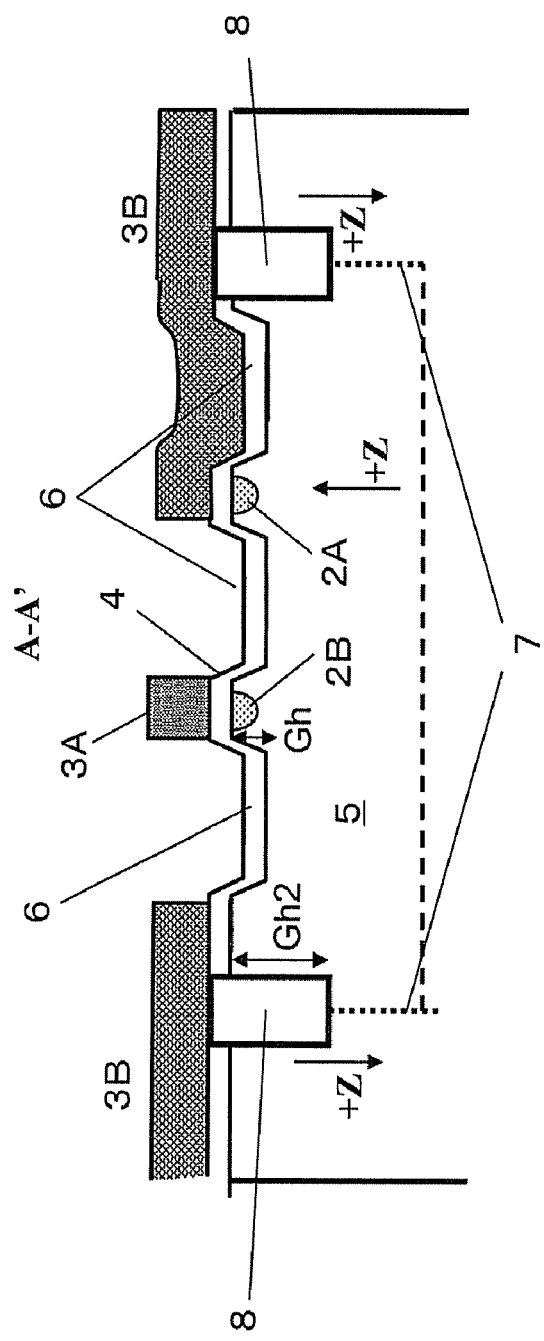

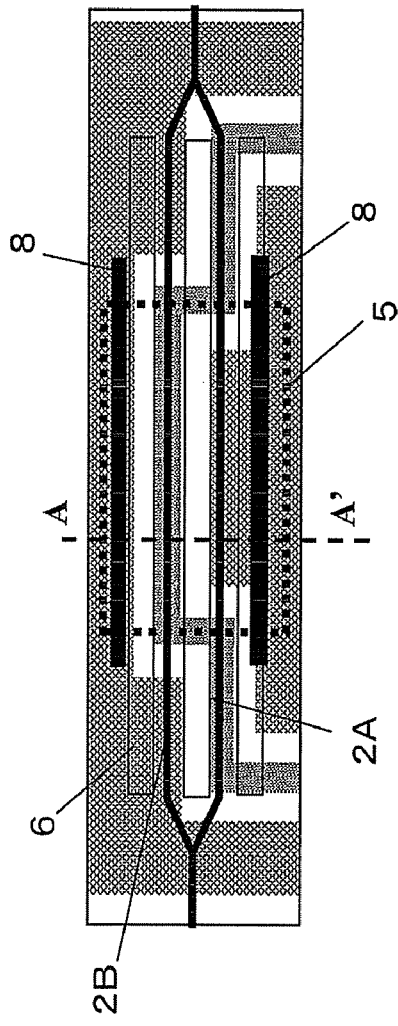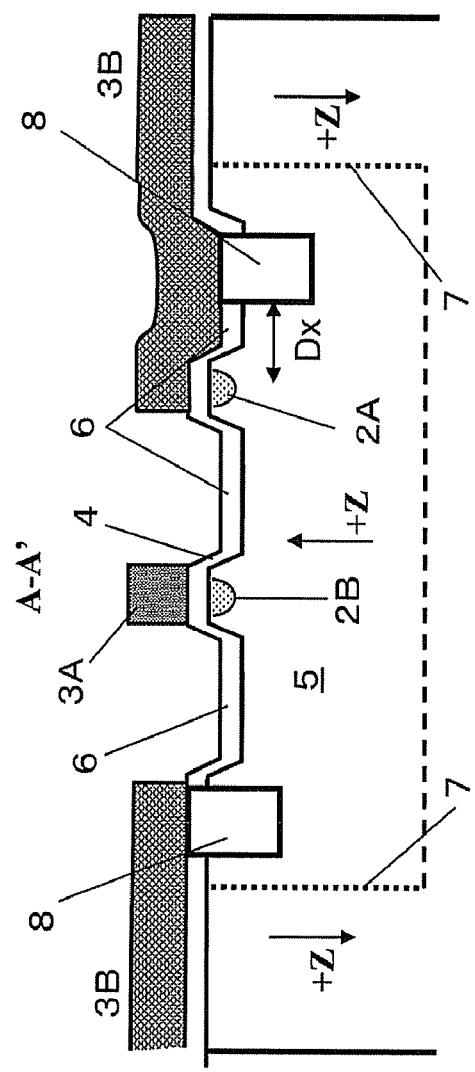

OPTICAL DEVICE AND METHOD RELATED THERETO

CROSS-REFERENCE TO RELATED APPLICATION

This application is related to and claims the benefit of priority of the prior Japanese Patent Application No. 2008-247207, filed on Sep. 26, 2008, the entire contents of which are incorporated herein by reference.

BACKGROUND

1. Field

The embodiment(s) discussed herein are directed to an optical device that controls an optical signal in optical communication.

2. Description of the Related Art

Generally, ultra-high-speed WDM (wavelength division multiplex) systems are required to support features such as broadband, low voltage and low insertion loss.

A Mach-Zehnder modulator using an electrooptic crystal substrate of $LiNbO_3$, $LiTaO_3$ or the like and having a waveguide is an optical modulator which has low insertion loss, low frequency chirping and is less wavelength-dependent, and is therefore advantageous in WDM systems.

FIG. 1 illustrates a configuration example of an optical modulator as an optical device. FIG. 1A is a top view of the optical modulator, FIG. 1B and FIG. 1C are cross-sectional views along line A-A' and line B-B' of FIG. 1A respectively.

The optical modulator is formed as follows. Using an electrooptic crystal substrate of $LiNbO_3$ or $LiTaO_3$ or the like, an optical waveguide 2 (2A, 2B) is formed by forming a metal film on a part of a crystal substrate 1 and making the metal film thermally diffuse or realizing proton exchanges or the like in benzoic acid after patterning. Electrodes (signal electrode 3A and grounding electrode 3B) are then provided in the vicinity of the optical waveguide 2 to form the optical modulator.

In such a case, an isolation film of $SiO_2$ or the like is formed as a buffer layer 4 between the signal electrode 3A, grounding electrode 3B, and the electrooptic crystal substrate 1 to prevent light absorption by the electrodes.

Here, to drive the optical modulator at high speed, terminals of the signal electrode 3A and grounding electrode 3B are connected together via a resistor to form a traveling wave electrode and a microwave signal is applied thereto from the input side.

In this case, an electric field causes refractive indexes of the pair of waveguides 2A, 2B to vary as $+\Delta na$, $-\Delta nb$ respectively, which causes a phase difference between optical signals propagating through the waveguides 2A and 2B to vary. In this way, signal light whose intensity is modulated with respect to an optical signal incident on the waveguide 2 (in) on the incidence side is output from the output waveguide 2 (out).

Furthermore, by changing the sectional shapes of the signal electrode 3A and grounding electrode 3B to control the effective refractive index of microwave and causing the velocity of light to match the velocity of microwave, it is possible to obtain wideband optical frequency response.

However, when the absolute values of electric fields applied to the pair of waveguides 2A, 2B are different, $\Delta na < \Delta nb$ results, producing a phenomenon (chirping) in transition from ON-state to OFF-state that the wavelength of output light varies.

To solve this problem, a crystal substrate, in a part of which a polarization-inverted region is formed, is used. That is, in FIG. 1, the portion surrounded by the broken line is a polarization-inverted region 5 and the signal electrode 3A is made to pass over the waveguide 2A in the non-inverted region outside the polarization-inverted region 5 (FIG. 1B) and over the waveguide 2B inside the inverted region 5 (FIG. 1C). In the figure, the arrow "+Z" denotes the polarization direction.

In FIG. 1A, when the length of the waveguide is approximately $L1=L2$, the phase of light passing through the waveguides 2A and 2B changes by $+\Delta\theta s$, $-\Delta\theta g$ in the non-inverted region and by $+\Delta\theta g$, $-\Delta\theta$ in the inverted region respectively. Here, $\Delta\theta s$ and $\Delta\theta g$ denote the amounts of phase variation of light by the signal electrode 3A (signal) and grounding electrode 3B (ground) respectively.

Therefore, the phases of light passing through the waveguides 2A and 2B vary by $+(\Delta\theta s+\Delta\theta g)$ and $-(\Delta\theta s+\Delta\theta g)$ respectively at a Y-branch waveguide 2D on the output side, resulting in a phase modulation with the two values having the same absolute value yet inverted signs. This allows wavelength chirping to be reduced to 0.

As another optical device using polarization inversion, Japanese Patent Laid-Open No. 2005-274793 discusses a variable chirp modulator using demodulation in a polarization-inverted region, Japanese Patent Laid-Open No. 2005-284129 discusses a modulator having an optical modulator with flattened frequency response characteristics and Japanese Patent No. 3303346 discusses an example of a wavelength conversion element.

Here, in the optical function element whose electrooptic crystal substrate includes the polarization-inverted region, stress is generated in the boundary between the polarization-inverted region 5 and crystal substrate 1 when an ambient temperature changes. This stress generated causes a problem that the refractive index of the optical waveguide portion varies with the temperature.

With regard to a strain in such an inversion boundary, "Suppression of thermal drift in an ultra-high-speed $LiNbO_3$ optical modulator" T. Shiraishi et al., LEOS2007, TuC2 discusses an optical modulator device using a domain wall strain.

Furthermore, in accordance with a temperature variation, a change of refractive index of an optical waveguide has various adverse influences on device characteristics. In the Mach-Zehnder interferometer type optical modulator illustrated in FIG. 1 in particular, a refractive index change caused by temperature results in an operation point variation and deteriorates modulation characteristics significantly. This phenomenon is called a "temperature drift phenomenon."

On the other hand, Japanese Patent Laid-Open No. 8-166566 discusses a technique of widening bandwidths of an optical modulator using a structure with long ridge-like grooves, that is, ridge grooves (ridge waveguides) formed on both sides of an electrooptic crystal substrate in which optical waveguides are formed.

Furthermore, Japanese Patent Laid-Open No. 2005-275121 discusses an optical modulator including both a ridge waveguide and the polarization-inverted region 5. In the example described in Japanese Patent Laid-Open No. 2005-275121, the ridge waveguide is applied to a region where the optical waveguide and microwave interact with each other.

FIG. 2 illustrates a typical optical modulator provided with the above described ridge waveguide and polarization-inverted region with a top view (A) and cross-sectional views (FIG. 2B: section along line A-A') and (FIG. 2C: section along line B-B'). Parts similar to those in FIG. 1 are assigned the same reference numerals.

Here, a result of research conducted by the present inventor shows that in a case where there are ridge grooves 6 on a substrate surface between a domain wall 7 (boundary between a polarization-inverted region and non-polarization-inverted region) and waveguides 2A and 2B, stress generated from the domain wall 7 is reduced by the ridge grooves 6, which reduces the possibility of the stress affecting the waveguides 2A and 2B.

On the other hand, since the ridge waveguide having the ridge grooves 6 is formed in the vicinity of the waveguides 2A and 2B, light insertion loss thereof increases due to scattering by sidewall of the ridge structure. Therefore, optical modulators with no ridge waveguide formed are often adopted.

Moreover, even in the case where the ridge waveguide is formed, the formation of the ridge waveguide needs to be limited to a minimum area.

Furthermore, a result of research conducted by the present inventor proved that increasing the depth of the ridge grooves 6 increases the effect of reducing stress. However, increasing the depth of the ridge grooves 6 of a normal ridge waveguide too much results in an increase in the drive voltage, and therefore it is not possible to increase the depth for only the effect of reducing stress and the effect of reducing stress is insufficient. For example, Japanese Patent Laid-Open No. 8-166566 discusses that the depth of the grooves should be within a range of 1 to 10 μm.

It is therefore an object of the present invention to provide an optical device that solves problems associated with typical a optical device including the problem of a temperature drift phenomenon caused by such a polarization-inverted structure inside crystal and strain of an boundary of polarization inversion and sufficiently reduce the temperature drift without increasing light insertion loss nor deteriorating optical modulation characteristics of drive voltage or the like.

SUMMARY

According to an aspect of the invention, an optical device includes an electrooptic crystal substrate, a polarization-inverted region formed in a part of the electrooptic crystal substrate, an optical waveguide formed in the electrooptic crystal substrate, and a groove for relaxing stress disposed between a domain wall of the polarization-inverted region and the optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

These and/or other aspects and advantages will become apparent and more readily appreciated from the following description of the embodiments, taken in conjunction with the accompanying drawings of which:

FIGS. 1A, 1B and 1C illustrate a typical configuration example of an optical modulator as an optical device;

FIG. 4 schematically illustrates stress generated at an domain wall;

FIGS. 8A and 8B illustrate an optical modulator according to an embodiment;

FIGS. 9A and 9B illustrate an example of an embodiment;

DETAILED DESCRIPTION OF THE EMBODIMENTS

Figure 2A:
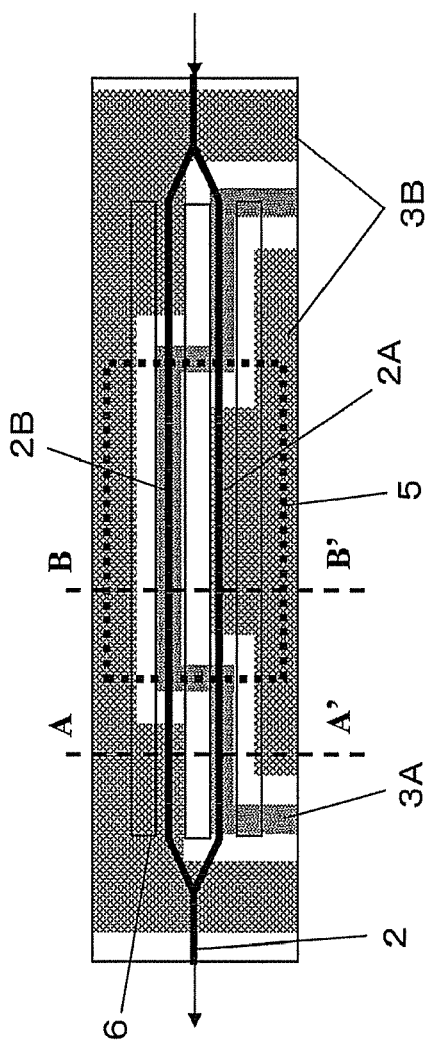
FIGS. 2A, 2B and 2C illustrate a typical ridge waveguide provided with a ridge waveguide and polarization-inverted region, and an optical modulator including a domain inverted region.
Figure 2B:
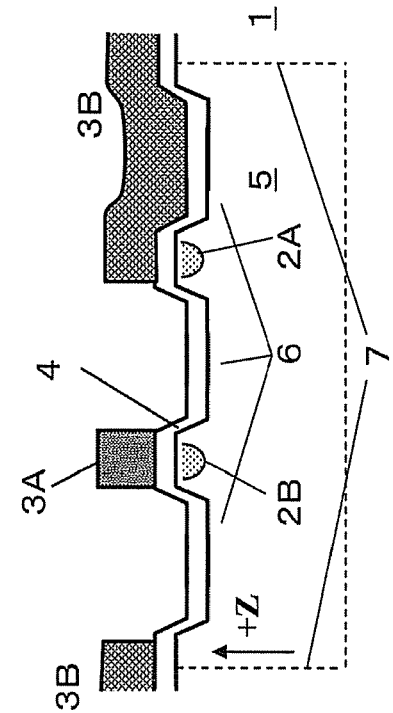
Figure 2C:
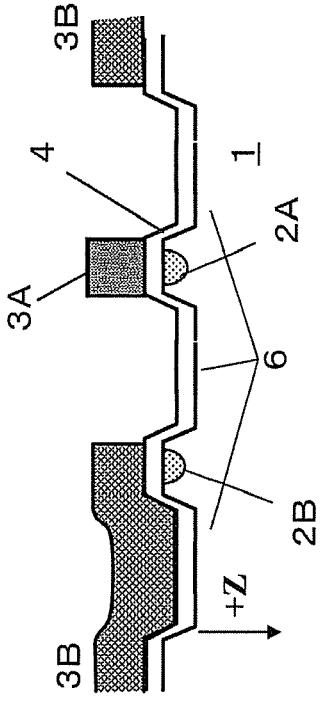

Reference will now be made in detail to the embodiments, examples of which are illustrated in the accompanying drawings, wherein like reference numerals refer to the like elements throughout. The embodiments are described below to explain the present invention by referring to the figures.

Hereinafter, preferred embodiments of an optical device (optical function device) will be explained with reference to the accompanying drawings.

Figure 3A:
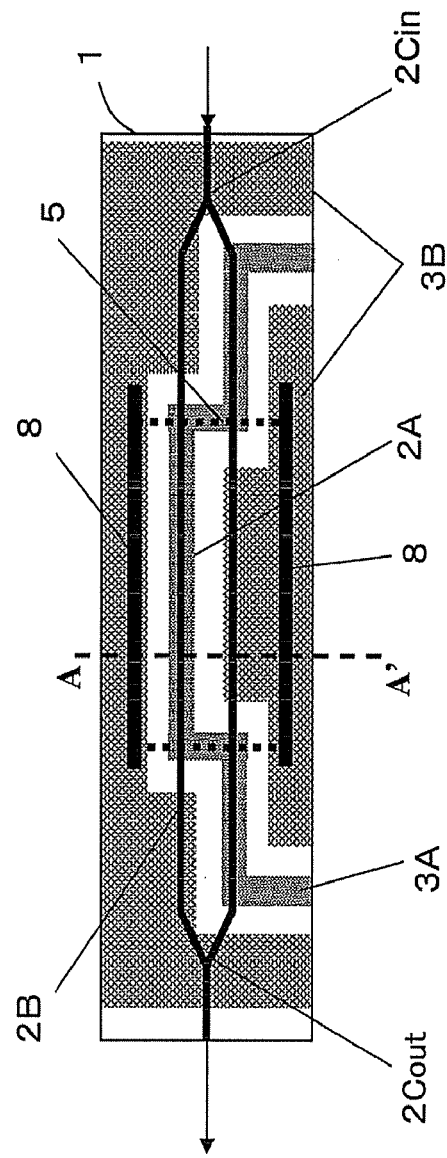
FIGS. 3A and 3B illustrate an optical modulator as an embodiment of an optical device.
Figure 3B:
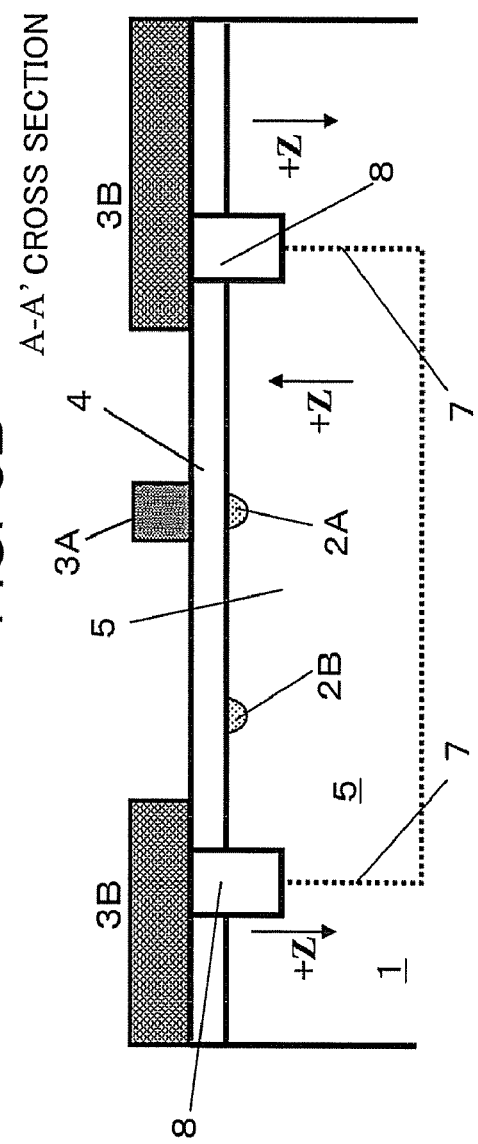

FIG. 3 illustrates an optical modulator as an embodiment of an optical device; FIG. 3A illustrating a top view and FIG. 3B illustrating a cross-sectional view along a line A-A'.

The optical modulator of an embodiment includes optical waveguides 2A and 2B having no ridge structure and a domain wall 7 along the optical waveguides 2A and 2B on a $LiNbO_3$ or $LiTaO_3$ crystal substrate 1 which is an electrooptic crystal.

The optical modulator illustrated in FIG. 3 is an example of an embodiment of the present invention applied to a zero chirped modulator using polarization inversion, but the present invention is also naturally applicable to modulators in other configurations if the optical waveguide 2 and domain wall 7 along the optical waveguide 2 are included in the crystal substrate 1.

In FIG. 3, grooves 8 are provided as grooves for relaxing stress on the substrate surface of the portion where the domain wall 7 which is an boundary between the polarization-inverted region 5 and the non-polarization-inverted region in the electrooptic crystal substrate 1.

Stress generated from the domain wall 7 is believed to be generated uniformly at the boundary between the polarization-inverted region 5 and the electrooptic crystal substrate 1. Therefore, providing the grooves 8 in the domain wall 7 to serve as grooves for relaxing stress prevents domain wall stress from directly being transmitted to the waveguides 2A and 2B and can reduce the amount of strain given to the waveguides 2A and 2B.

In FIG. 3, the grooves 8 which are gas layers are provided as the grooves for relaxing stress, but the application scope is not limited to this. That is, it is also possible to adopt a structure with the grooves 8 filled with a filler, for example, whose Young's modulus is lower than that of the crystal substrate 1 instead of the gas layers. An inactive gas such as nitrogen may also be used as the gas for gas layers 8 or air may be used.

As the filler, polymer-based soft (low Young's modulus) matter such as $SiO_2$, polyimide is preferable. The existence of such grooves 8 which are the grooves for relaxing stress reduces stress 9 generated in the domain wall 7 schematically illustrated in FIG. 4, and can reduce the influence on the waveguides. That is, strains given to the waveguides 2A and 2B can be reduced.

As a supplement here, the relationship between a temperature drift and strain given to the waveguide will be explained. In the Mach-Zehnder interferometer (MZI) type optical modulator illustrated in FIG. 1, when input/output branch couplers 2Cin and 2Cout have 3 dB and there is no loss in the MZI portion, light intensity of the output with respect to light intensity $S_0$ of the input is expressed by:

$$S = S_0 \text{COS}^2\left(\frac{\phi_2 - \phi_1}{2}\right) \quad \text{Expression 1}$$

Here, $\phi_2$ and $\phi_1$ are phase variations of light in the optical waveguides 2A and 2B respectively, and expressed by:

$$\phi = (n_0 + \Delta n)L = \left(n_0 - \frac{n_0^3}{2}r\Gamma E\right)L \quad \text{Expression 2}$$

Here, $n_0$ is a refractive index of the substrate, r is an electrooptic coefficient, $\Gamma$ is electric field efficiency, E is an electric field applied between the signal electrode 3A and grounding electrode 3B, L is an action length between the signal electrode 3A and waveguides 2A and 2B. That is, from such a relational expression, the light intensity of an MZI type optical modulator can be said to vary depending on the difference in refractive index between the two waveguides 2A and 2B.

As described above, predetermined operation points of a light intensity curve are set in the optical modulator and the signal is modulated using the operation points as a reference.

Here, suppose a difference in refractive index has been produced by a temperature between the two waveguides 2A and 2B. Assuming the voltage for moving to a predetermined operation point is Vb and the modulation voltage is Vs, the aforementioned expression expressing the light intensity is expressed by:

$$S = S_0\text{COS}^2(A(Vb+Vs)+B\Delta n(T)) \quad \text{Expression 3}$$

A and B are proportion constants, $\Delta n(T)$ is a difference in refractive index produced by a temperature between the two waveguides 2A and 2B.

Vb is generally a DC voltage (bias voltage) and Vs is a high-speed radio frequency (RF) signal to drive the modulator. When $\Delta n(T)$ is produced by a temperature, this means that the position of an operation point set by Vb is shifted.

On the other hand, as shown in "Suppression of thermal drift in an ultra-high-speed $LiNbO_3$ optical modulator" T. Shiraishi et al., LEOS2007, TuC2, when an domain wall strain of polarization inversion varies due to a temperature, the refractive index varies due to a photoelastic effect.

Assuming an amount of strain applied to the waveguides 2A and 2B is S, the refractive index variation is expressed by the following expression.

$$\Delta n = -\frac{1}{2}n^3 pS \quad \text{Expression 4}$$

Here, is a strain added to the crystal substrate 1 and p is a photoelastic coefficient. For example, when $LiNbO_3$ is used for the electrooptic crystal substrate 1, since the photoelastic constant p has a positive sign, if the stress layer is formed so that a positive strain (extending strain) is added to the substrate surface, the refractive index decreases. The relationship between the strain and stress T can be derived by solving the elasticity equation from the elastic constant of the crystal substrate.

The elasticity equation is expressed by a tensor equation and expressed as [T]=[c][S]. Here, c is an elastic constant and determined by the material of the crystal substrate 1.

For example, in the case of a $LiNbO_3$ substrate, when the stress T is negative, the strain generated becomes negative, whereas when the stress T is positive, the strain generated becomes positive and the intensity thereof can also be considered to have a proportional relationship.

If stress or strain added to the waveguides 2A and 2B can be reduced through the above described effect, the temperature drift can be reduced.

In FIG. 3, since the provision of the grooves 8 as the grooves for relaxing stress can reduce stress or strain added to the waveguides 2A and 2B, the temperature drift can also be reduced.

FIG. 5 illustrates a modification to the above-described embodiment.

Figure 5A:
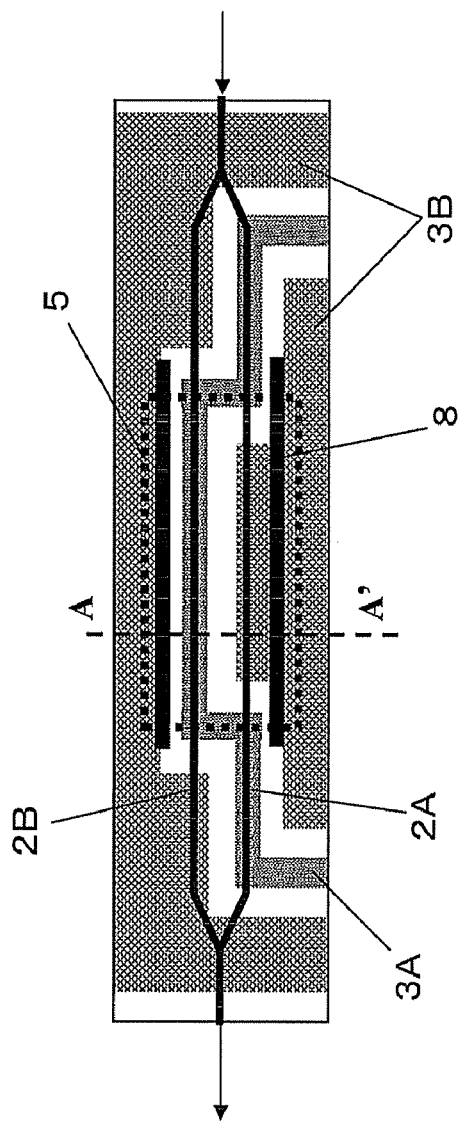
FIGS. 5A and 5B illustrate an embodiment of a device of the present invention.
Figure 5B:
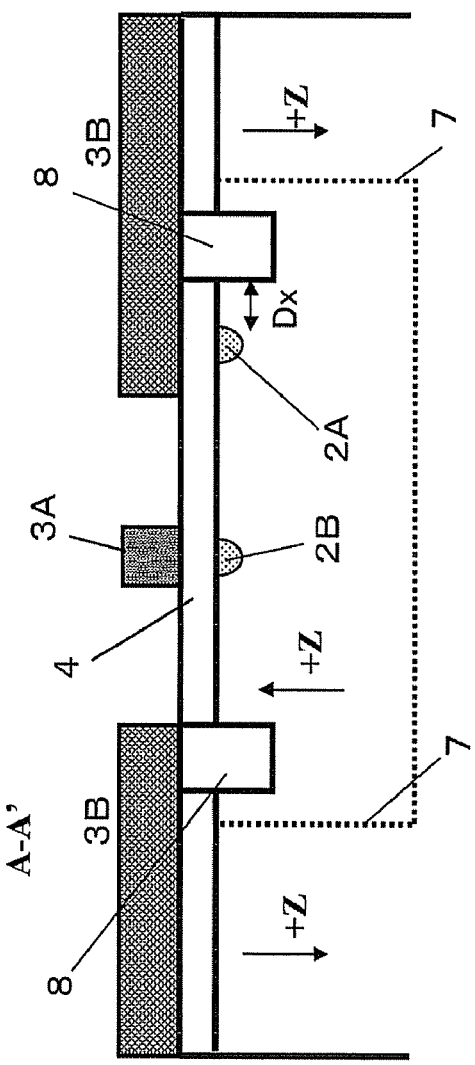

In the embodiment configuration illustrated in FIG. 5, grooves 8 which are the grooves for relaxing stress are located not right above a domain wall 7 but between the domain wall 7 and optical waveguides 2A and 2B. The rest of the configuration is the same as that of the embodiment in FIG. 3. FIG. 5A illustrates a top view thereof and FIG. 5B is a cross-sectional view along line A-A'. Therefore, explanations of parts overlapping with those in FIG. 3 will be omitted.

As for the positions of the grooves 8 with respect to the optical waveguides 2A and 2B, the grooves 8 are formed only on one side of the respective optical waveguides 2A and 2B to thereby avoid deterioration due to light insertion loss in the grooves 8.

Furthermore, when the distance between the interface of the optical waveguide 2A and the interface of the grooves 8 in FIG. 5 is assumed to be Dx, Dx can be sufficiently widened and a temperature drift can be reduced without deterioration due to light insertion loss.

A result of research conducted by the present inventor shows that Dx which will not cause deterioration due to light insertion loss is preferably 10 μm or more.

On the contrary, the typical ridge waveguide requires the grooves to be formed in proximity to the waveguide. As is discussed in Japanese Patent Laid-Open No. 10-39266, the Dx equivalent of the distance between the groove formed and the interface of the optical waveguide 2A in such a case is 6 μm or less assuming that the width of the optical waveguide is 8 μm.

On the contrary, the embodiment illustrated in FIG. 5 assumes Dx to be 10 μm or more, and therefore the grooves 8 as the grooves for relaxing stress differ from the grooves described above in Japanese Patent Laid-Open No. 10-39266 in the purpose and nature.

Figure 6:
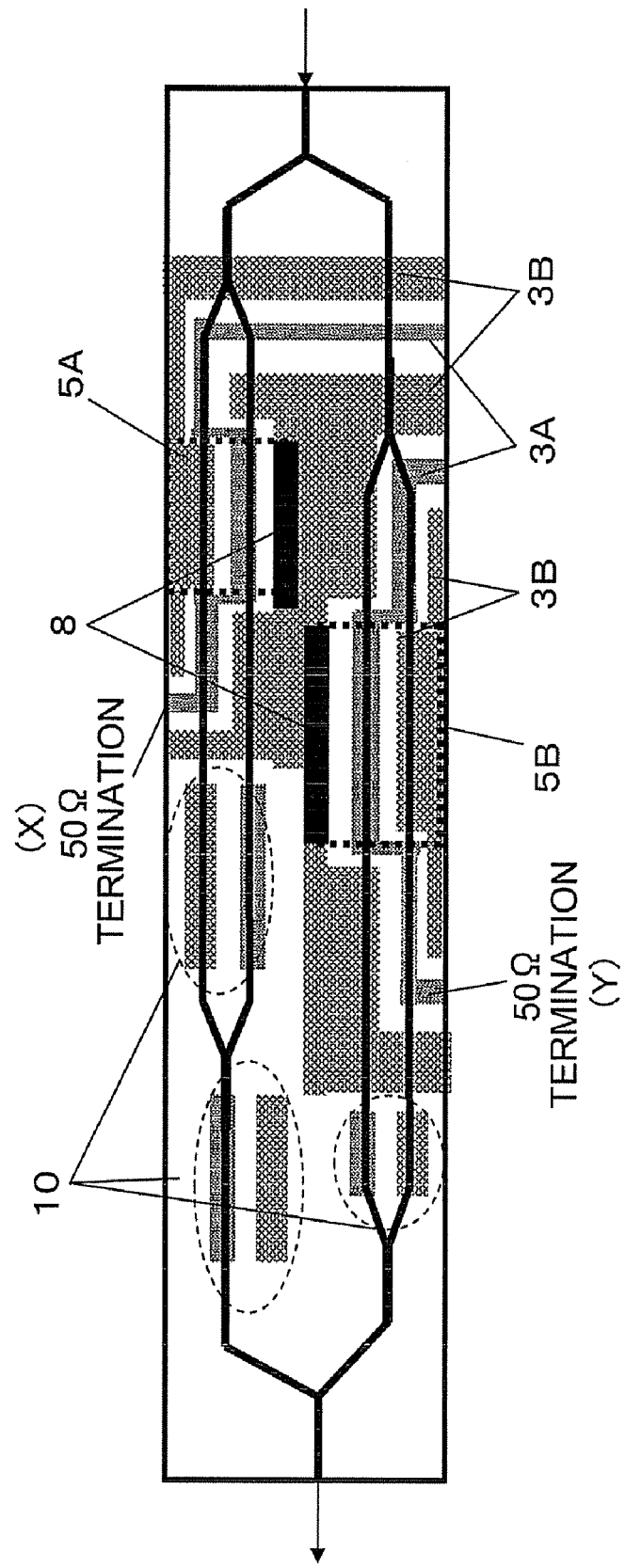
FIG. 6 illustrates a top view of an optical modulator according to an embodiment.

FIG. 6 illustrates a top view of an optical modulator according to an embodiment. This embodiment is an example of the present invention applied to a modulator that performs DQPSK (Differential Quadrature Phase Shift Keying) modulation in a format with two Mach-Zehnder interferometers (MZI) placed side by side.

Such a complex modulator chip configuration is required in line with the introduction of multivalued modulation formats in recent years.

In FIG. 6, a microwave is input between a signal electrode 3A and a grounding electrode 3B at the bottom of the chip (bottom in FIG. 6) and an upper Mach-Zehnder interferometer MZI provides 50Ω termination (X) at the top of the chip. On the other hand, a lower Mach-Zehnder interferometer MZI provides 50Ω termination (Y) at the bottom of the chip.

The input section and output section of the microwave need to be freely arranged according to the consistency with an outside interface.

The upper Mach-Zehnder interferometer MZI and lower Mach-Zehnder interferometer MZI, and a Mach-Zehnder interferometer MZI after multiplexing the upper and lower microwaves are each provided with a DC electrode 10 for supplying a DC voltage that sets a bias voltage for phase adjustment.

There is also a method of achieving commonality with the signal electrode 3A using a Bias Tees for the phase adjustment DC electrode 10. A free design is also required with regard to the arrangement and the presence/absence of the DC electrode 10 from the standpoint of cost and characteristic matching with an outside driver circuit.

In the example illustrated in FIG. 6, the domain wall parallel to the waveguide is formed only on one side of the upper Mach-Zehnder interferometer MZI and lower Mach-Zehnder interferometer MZI in the polarization-inverted regions 5A and 5B respectively. Therefore, one groove 8 which is the groove for relaxing stress is formed in the respective Mach-Zehnder interferometers MZI in correspondence with the one domain wall formed.

Furthermore such a free design is becoming extremely important from the standpoint of the electrode arrangement of the chip and polarization inversion arrangement which are becoming increasingly complex. In general, when a ridge waveguide is formed in consideration of bandwidth of an optical modulator, only the modulation section is made up of a ridge waveguide. This is intended to minimize the aforementioned deterioration due to light insertion loss.

Figure 7:
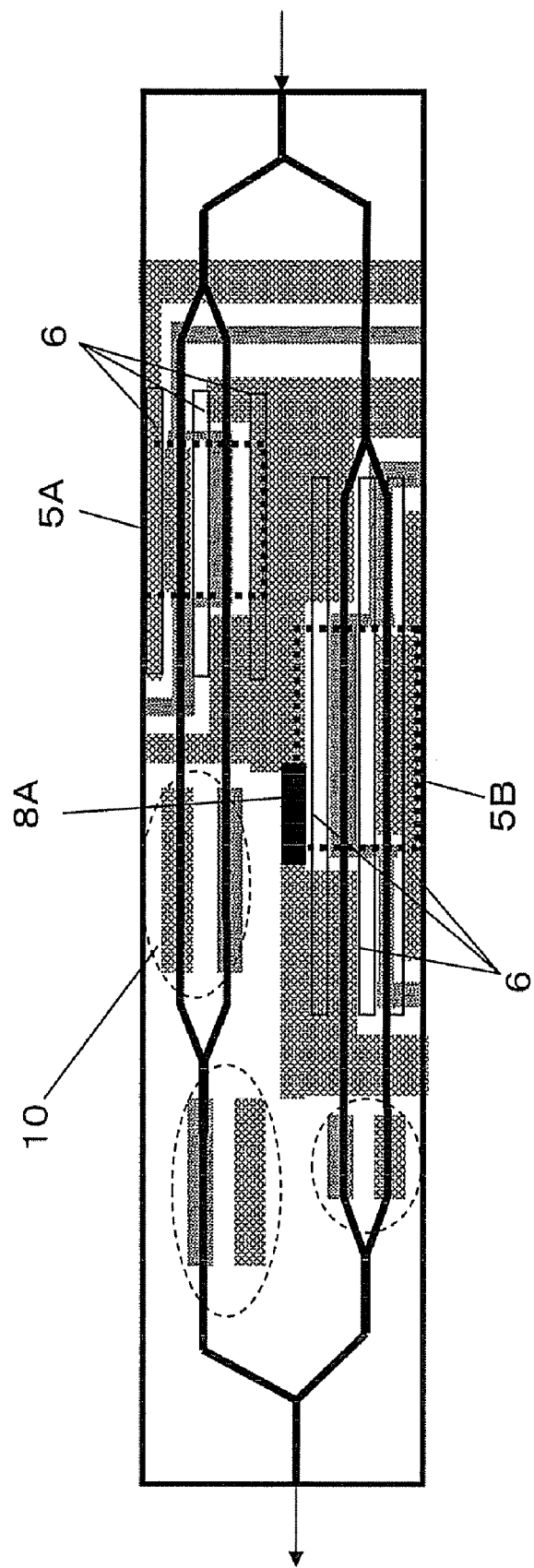
FIG. 7 illustrates formation of a groove section for reducing stress according to an embodiment.

Moreover, even when the ridge waveguide is formed, as illustrated in FIG. 7, the chip may be more complicated and there may be a portion where the non-ridge waveguide of the DC electrode 10 comes closer along the domain wall of the polarization-inverted region 5B corresponding to the lower Mach-Zehnder interferometer MZI. In such a case, forming the groove 8 which is the groove for relaxing stress allows a temperature drift to be reduced.

FIG. 8 illustrates a top view (FIG. 8A) and a cross-sectional view (FIG. 8B) along line A-A' of an optical modulator according to an embodiment. This embodiment, the present invention is applicable to a case where a polarization-inverted region 5 is located along an optical waveguide in which a ridge waveguide is formed.

The depth (Gh in FIG. 8) of grooves 6 of the ridge waveguide is on the order of several μm (1 to 10 μm) as described above. When the depth is greater, deterioration of the drive voltage becomes noticeable.

In an embodiment, grooves 8 which serve as the grooves for relaxing stress whose depth (Gh2) is greater than that of the ridge grooves 6 are formed above a domain wall 7. Here, the stress relaxing effect depends on the depth of the grooves 8 and setting Gh2>Gh makes it possible to relax stress without deteriorating the modulation characteristics.

FIG. 9 illustrates a modification to the above-identified embodiment. FIG. 9 illustrates a top view (FIG. 9A) and a cross-sectional view (FIG. 9B) of an optical modulator of an embodiment. Parts equivalent to those in FIG. 8 have similar functions, and so further explanations will be omitted.

In FIG. 9, grooves 8 for relaxing stress are located not right above a domain wall 7 but between waveguides 2A and 2B, and ridge grooves 6. The positions of the grooves 8 for relaxing stress are not limited to this and, for example, a part of the grooves 8 may overlap with the ridge grooves 6 as illustrated. However, the distance Dx between the waveguide 2A and the groove 8 for relaxing stress is preferably 10 μm or more to prevent deterioration due to light insertion loss.

Figure 10A:
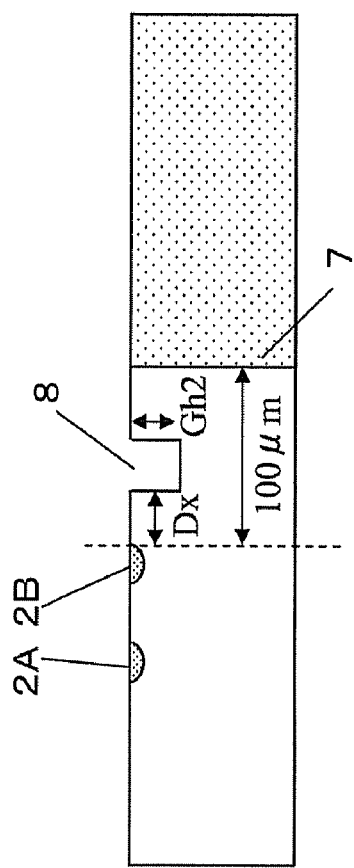
FIGS. 10A and 10B illustrate a simulation result for confirming effect(s) of the embodiments.
Figure 10B:
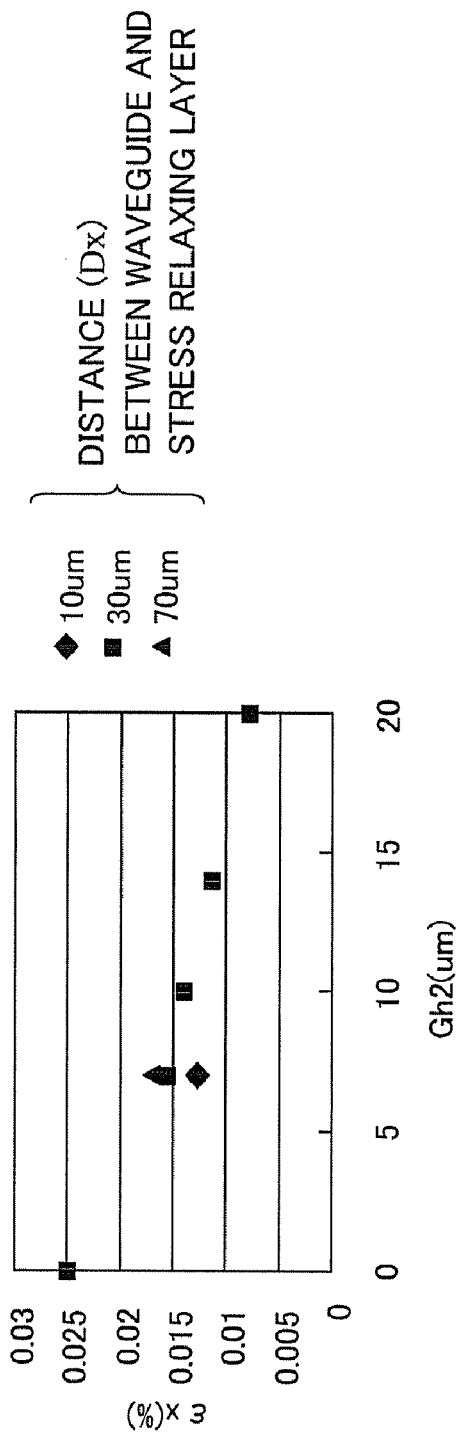

In FIG. 10, assuming that stress of an arbitrary value is generated in the domain wall 7 to confirm the effects of the above described embodiments, FIG. 10A illustrates a cross-sectional view and FIG. 10B illustrates an example of simulation assuming an amount of strain added to the waveguides 2A and 2B is ϵx.

In FIG. 10B, the vertical axis indicates the amount of strain ϵx added to the waveguides 2A and 2B in the horizontal direction and the horizontal axis indicates the depth Gh2 of the groove 8 for relaxing stress. As the depth Gh2 of the groove 8 for relaxing stress increases, a greater amount of strain ϵx added to the waveguides can be reduced. That is, it is understandable that the amount of temperature drift proportional to the amount of strain ϵx can be reduced.

It is understandable that the degree of reduction of the amount of strain ϵx greatly depends on Gh2 and does not depend so much on the distance Dx between the waveguide 2A (2B) and domain wall 7.

That is, it is understandable that the amount of strain ϵx can be reduced sufficiently even if the domain wall 7 is placed apart from the optical waveguide 2A such that the distance Dx becomes 10 μm or more.

Figure 11A:
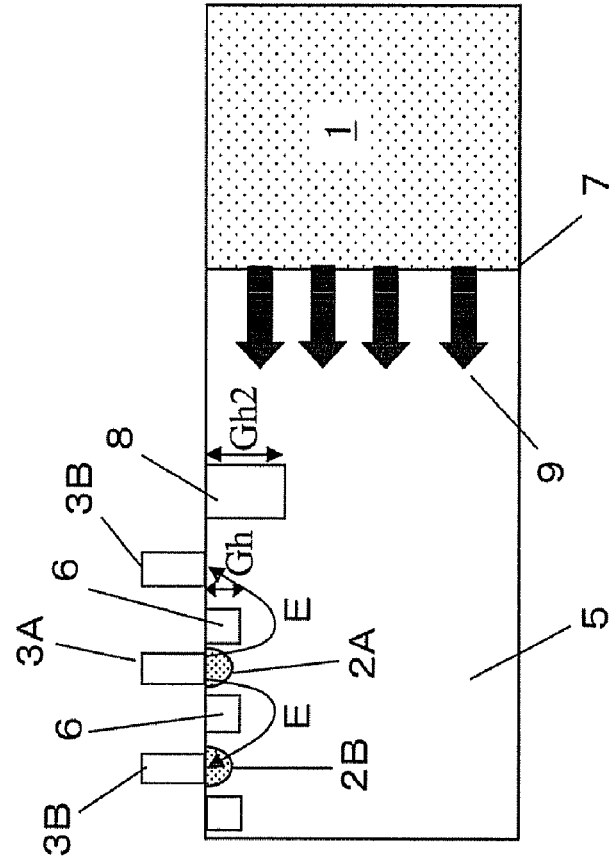
FIGS. 11A and 11B illustrate a simulation result for confirming effect(s) of the embodiments and illustrate a calculation result showing the effect(s) of an embodiment of the present invention.
Figure 11B:
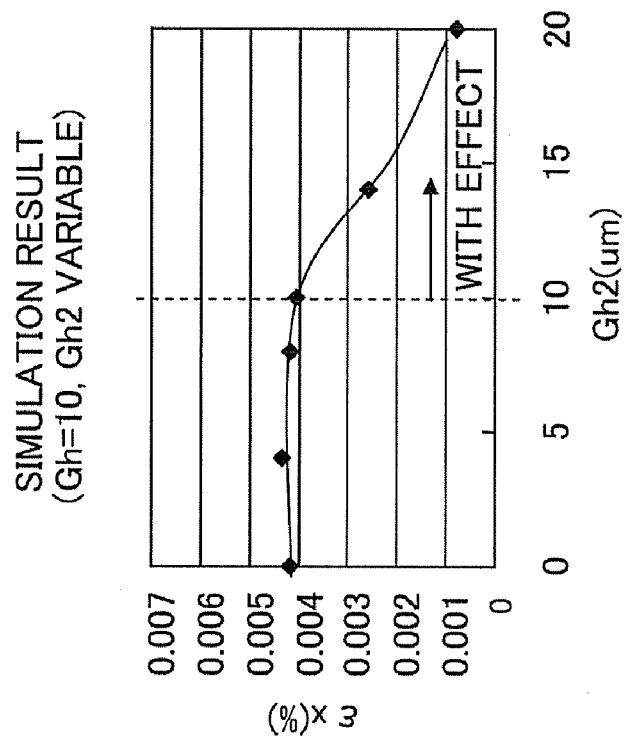

FIG. 11 illustrates a simulation result to confirm the effects of the embodiments in FIG. 8 and FIG. 9. FIG. 11 illustrates an example where the grooves 8 deeper than the ridge grooves 6 are formed between the ridge grooves 6 and the domain wall 7 in the case of the ridge waveguide. A temperature drift can be reduced by forming the grooves 8 for relaxing stress of Gh2 which is greater than the depth (Gh=10 μm) of the ridge grooves 6. In this case, as described above, the temperature drift can be reduced even if the depth Gh2 of the grooves 8 for relaxing stress is increased without deteriorating the modulation characteristics.

According to an embodiment a for the manufacture of an optical device is provided including forming an electrooptic crystal substrate having a polarization-inverted region as part thereof, forming an optical waveguide in the electrooptic crystal substrate and forming a groove for relaxing stress disposed between a domain wall of the polarization-inverted region and the optical waveguide.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An optical device, comprising:
   an electrooptic crystal substrate;
   a polarization-inverted region formed in a part of the electrooptic crystal substrate;
   an optical waveguide formed in the electrooptic crystal substrate; and
   a groove for relaxing stress disposed between a domain wall of the polarization-inverted region and the optical waveguide.

2. The optical device according to claim 1, wherein the domain wall corresponds to a position of the groove for relaxing stress.

3. The optical device according to claim 1, wherein the domain wall is disposed on one side of the optical waveguide and the groove for relaxing stress is formed on one side of the optical waveguide.

4. The optical device according to claim 1, wherein the groove for relaxing stress is formed on one side of the optical waveguide.

5. An optical device, comprising:
   a signal electrode that applies a microwave; and
   a DC application electrode that applies a DC voltage, and
   wherein the signal electrode is a ridge waveguide,
   the DC application electrode is disposed over a planar type optical waveguide,
   a part of the optical waveguide is formed so as to come closer along a domain wall, and
   a groove for relaxing stress is provided between one of the domain wall and the optical waveguide and at a position of the domain wall.

6. The optical device according to claim 1, wherein a distance between the optical waveguide and the groove for relaxing stress is 10 µm or more.

7. An optical device, comprising:
   a polarization-inverted region disposed in a part of an electrooptic crystal substrate; and
   a ridge optical waveguide formed in the electrooptic crystal substrate, at both ends of which grooves are formed, and
   wherein a domain wall is formed along at least a part of the ridge optical waveguide and at least one groove for relaxing stress is provided between the domain wall and the optical waveguide, and
   a depth of the groove for relaxing stress is greater than a depth of the grooves forming the ridge optical waveguide.

8. The optical device according to claim 7, wherein a domain wall is formed at a position of the groove for relaxing stress.

9. The optical device according to claim 7, wherein the groove forming the ridge optical waveguide partially overlaps with the groove for relaxing stress.

10. The optical device according to claim 7, wherein a distance between the optical waveguide interface and a groove interface forming the ridge waveguide is 6 µm or less and a distance between the optical waveguide interface and the groove interface for relaxing stress is 10 µm or more.

11. The optical device according to claim 1, wherein the electrooptic crystal is $LiNbO_3$ or $LiTaO_3$.

12. The optical device according to claim 1, wherein the groove for relaxing stress is a groove formed on the crystal surface and a gas layer.

13. A method for the manufacture of an optical device, comprising:
   forming an electrooptic crystal substrate having a polarization-inverted region as a part;
   forming an optical waveguide in the electrooptic crystal substrate; and
   forming a groove for relaxing stress disposed between a domain wall of the polarization-inverted region and the optical waveguide.

* * * * *